United States Patent
Kim et al.

(10) Patent No.: US 12,405,814 B2
(45) Date of Patent: Sep. 2, 2025

(54) METHOD AND SYSTEM FOR EFFICIENT HARDWARE MAPPING OF GENERATIVE GIANT ARTIFICIAL INTELLIGENCE MODEL

(71) Applicant: HyperAccel Co., Ltd., Hwaseong-si (KR)

(72) Inventors: Junsoo Kim, Hwaseong-si (KR); Seungjae Moon, Hwaseong-si (KR); Gyubin Choi, Hwaseong-si (KR)

(73) Assignee: HyperAccel Co., Ltd., Hwaseong-si (KR)

( * ) Notice: Subject to any disclaimer, the term of this patent is extended or adjusted under 35 U.S.C. 154(b) by 0 days.

(21) Appl. No.: 18/743,799

(22) Filed: Jun. 14, 2024

(65) Prior Publication Data
US 2024/0419467 A1 Dec. 19, 2024

(30) Foreign Application Priority Data
Jun. 16, 2023 (KR) .................. 10-2023-0077570

(51) Int. Cl.
*G06F 30/20* (2020.01)
*G06F 9/455* (2018.01)
*G06F 11/362* (2025.01)

(52) U.S. Cl.
CPC .......... *G06F 9/455* (2013.01); *G06F 11/3648* (2013.01)

(58) Field of Classification Search
CPC .............. G06F 11/3648; G06F 9/455
USPC ........................................ 703/22
See application file for complete search history.

(56) References Cited

U.S. PATENT DOCUMENTS

| | | | |
|---|---|---|---|
| 6,230,114 B1 * | 5/2001 | Hellestrand | G06F 11/261 714/28 |
| 6,539,522 B1 * | 3/2003 | Devins | G01R 31/318357 716/136 |
| 9,684,752 B2 | 6/2017 | Harper et al. | |
| 10,878,153 B1 | 12/2020 | Senapati et al. | |
| 11,361,133 B2 | 6/2022 | Denisenko | |
| 2009/0006068 A1 * | 1/2009 | Igarashi | G06F 30/33 703/16 |

FOREIGN PATENT DOCUMENTS

| | | |
|---|---|---|
| KR | 10-1100048 | 12/2011 |
| KR | 10-1100049 | 12/2011 |
| KR | 10-1160857 | 6/2012 |
| KR | 10-1278434 | 6/2013 |

(Continued)

OTHER PUBLICATIONS

Stockholm (A Survey of HW/SW Co-simulation Techniques and Tools, Thesis, (48 pages) (Year: 1998).*

(Continued)

*Primary Examiner* — Andre Pierre Louis
(74) *Attorney, Agent, or Firm* — CHRISTENSEN O'CONNOR JOHNSON KINDNESS PLLC (57) ABSTRACT

Provided is a method and system for efficient hardware mapping of a generative giant artificial intelligence model. A hardware mapping method may include receiving, by at least one processor, model software and sequentially performing, by the at least one processor, source code level simulation, instruction level simulation, and register transfer level simulation for the model software.

9 Claims, 5 Drawing Sheets

(56) References Cited

FOREIGN PATENT DOCUMENTS

| KR | 10-2021-0047286 | 4/2021 |
| KR | 10-2022-0041224 | 3/2022 |
| KR | 10-2022-0170146 | 12/2022 |

OTHER PUBLICATIONS

Rodrigo (Hardware-software model co-simulation for GPU IP development, (66 pages)) (Year: 2018).*

Request for the Submission of an Opinion mailed Aug. 31, 2023, issued in corresponding Korean Application No. 10-2023-0077570, filed Jun. 16, 2023, 8 pages.

Written Decision on Registration mailed Nov. 24, 2023, issued in corresponding Korean Application No. 10-2023-0077570, filed Jun. 16, 2023, 7 pages.

* cited by examiner

METHOD AND SYSTEM FOR EFFICIENT HARDWARE MAPPING OF GENERATIVE GIANT ARTIFICIAL INTELLIGENCE MODEL

CROSS-REFERENCE TO RELATED APPLICATION

This application claims the priority benefit of Korean Patent Application No. 10-2023-0077570, filed on Jun. 16, 2023, in the Korean Intellectual Property Office, the disclosure of which is incorporated herein by reference.

BACKGROUND

1. Field of the Invention

Example embodiments relate to a method and system for efficient hardware mapping of a generative giant artificial intelligence model, and more particularly, to a method and system for more quickly and efficiently mapping various generative giant artificial intelligence models rapidly distributed to a dedicated hardware structure such as field programmable gate array (FPGA)/application specific integrated circuit (ASIC).

2. Description of the Related Art

Recently, various generative artificial intelligence models are being rapidly distributed in software community. Due to difference between software development speed and hardware development speed, it is difficult to map them to a dedicated hardware structure. Also, unlike previous models, such as a convolutional neural network (CNN), a model size of 1 billion units further slows down the development speed.

Reference material includes Korean Patent Laid-Open Publication No. 10-2022-0041224.

SUMMARY

Example embodiments may provide a method and system for efficiently mapping a generative giant artificial intelligence model to hardware.

Technical subjects of the present invention are not limited to the aforementioned technical subjects and still other technical subjects not described herein will be clearly understood by one of ordinary skill in the art from the following description.

According to an example embodiment, there is provided a hardware mapping method of a computer device including at least one processor, the hardware mapping method including receiving, by the at least one processor, model software; and sequentially performing, by the at least one processor, source code level simulation, instruction level simulation, and register transfer level simulation for the model software.

According to an aspect, the performing may include cross-verifying an instruction written with the source code level simulation through the instruction level simulation.

According to another aspect, the hardware mapping method may further include receiving information on the existing hardware structure, and the performing may include determining whether implementation of the model software is possible with the existing hardware structure; adding a hardware module to the existing hardware structure when the implementation is impossible; and reperforming the instruction level simulation.

According to still another aspect, the performing may include writing a module-level test case for each instruction cross-verified through the source code level simulation and the instruction level simulation; and verifying at least one of the written test cases through the register transfer level simulation.

According to still another aspect, the verifying may include performing cross-verification through the register transfer level simulation and the instruction level simulation.

According to still another aspect, the performing may include processing cross-verification through the source code level simulation and the instruction level simulation using a graphics processing unit (GPU); and processing multithread loading of a file of the model software for the register transfer level simulation.

According to still another aspect, the processing of the multithread loading may include separating the file of the model software for each channel of a memory and loading the same to the memory through multithreading.

According to an example embodiment, there is provided a non-transitory computer-readable recording medium storing a program to execute the method on the computer device.

According to an example embodiment, there is provided a computer device including at least one processor configured to execute computer-readable instructions, wherein the at least one processor is configured to receive model software, and to sequentially perform source code level simulation, instruction level simulation and register transfer level simulation for the model software.

Specific details of other example embodiments are included in the detailed description and drawings.

According to some example embodiments, it is possible to provide a method and system for efficiently mapping a generative giant artificial intelligence model to hardware. Effects of the present invention are not limited to the aforementioned effects and still other effects not described herein will be clearly understood by one of ordinary skill in the art from the following description.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Advantages and features of the present invention and methods to achieve the same will become clear with reference to example embodiments described in detail along with the accompanying drawings. However, the present invention is not limited to example embodiments disclosed blow and may be implemented in various forms. Here, the example embodiments are provided to make the disclosure of the present invention complete and to fully inform one of ordinary skill in the art to which the present invention pertains of the scope of the present invention and the present invention is defined by the scope of the claims. Like reference numerals used herein refer to like elements throughout.

When it is described that one component is "connected to" or "coupled to" another component, it may be understood that the one component is directly connected to or coupled to the other component or that still other component is interposed between the two components. In contrast, it should be noted that when it is described that one component is "directly connected to" or "directly coupled to" to another component, still other component may not be present therebetween. As used herein, the expression "and/or" includes any one and any combination of the associated listed items.

The terms used herein are to explain the example embodiments and not to be limiting of the present invention. Herein, the singular forms "a," "an," and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, and/or elements.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present invention.

Unless otherwise defined herein, all terms used herein (including technical or scientific terms) have the same meanings as those generally understood by one of ordinary skill in the art. Also, terms defined in dictionaries generally used should be construed to have meanings matching contextual meanings in the related art and are not to be construed as an ideal or excessively formal meaning unless otherwise defined herein.

A hardware development process proceeds with register transfer level (RTL) simulation debugging for a written Verilog code. However, since RTL simulation uses register level verification, it is very slow to apply to a giant artificial intelligence model. Therefore, example embodiments may process sequential verification by adding code level simulation and instruction level simulation.

Also, in the case of the code level simulation and the instruction level simulation added to a development tool, simulation may be processed using a graphics processing unit (GPU) of NVIDA, which may reduce burden of simulation that needs to process large data.

Also, due to the code level simulation and the instruction level simulation, the RTL simulation may be configured to perform verification locally only on an instruction level or a module level.

Figure 1:
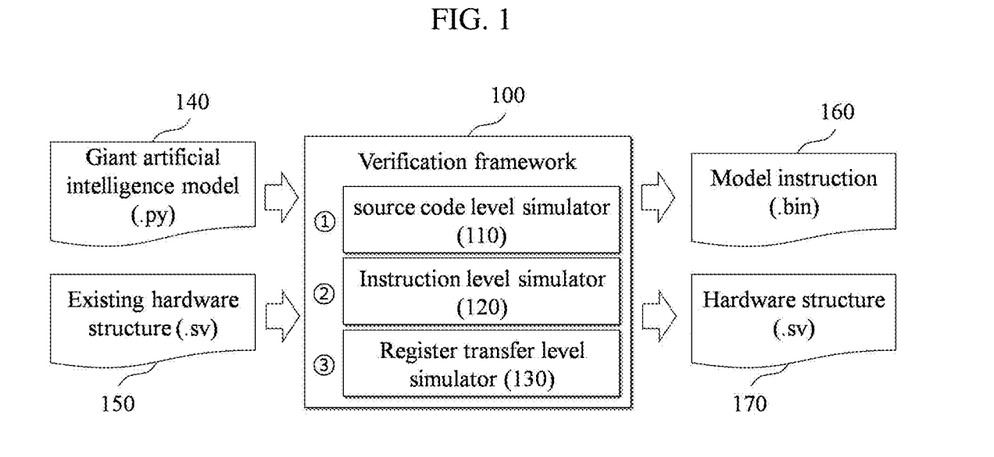
FIG. 1 illustrates an example of a verification framework according to an example embodiment.

FIG. 1 illustrates an example of a verification framework according to an example embodiment. A hardware mapping system according to the example embodiment may include a verification framework 100. The verification framework 100 may include a source code level simulator 110, an instruction level simulator 120, and a register transfer level simulator 130.

The verification framework 100 may receive a giant artificial intelligence model 140 and an existing hardware structure 150 and may output a model instruction 160 and a hardware structure 170 through verification using the source code level simulator 110, the instruction level simulator 120, and the register transfer level simulator 130. Here, a hardware structure 170 may include information on a structure of hardware to be mapped to the giant artificial intelligence model 140.

Figure 2:
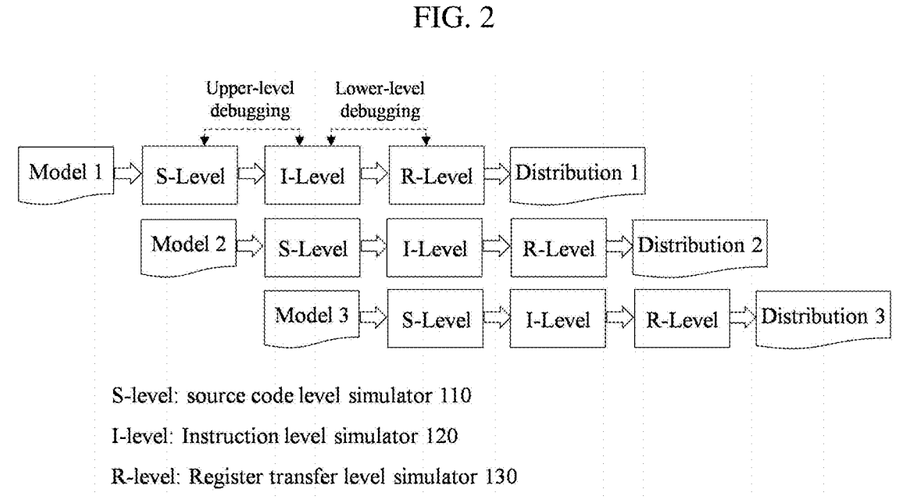
FIG. 2 illustrates an example of a process of verifying a plurality of models according to an example embodiment.

FIG. 2 illustrates an example of a process of verifying a plurality of models according to an example embodiment. FIG. 2 shows that a deployment time may be reduced by verifying models 1, 2, and 3 in a pipelined manner through the source code level simulator 110, the instruction level simulator 120, and the register transfer level simulator 130. The source code level simulator 110 may provide a function of viewing an intermediate value of a desired position at a source code level by setting a GPU prober at the desired position of the source code level. Through this, which instruction is required and which hardware structure is required may be identified. The instruction level simulator 120 is a simulator that generates and verifies an instruction for a model and, when verifying the instruction, information identified at a source code level becomes a correct answer and the source code level simulator 110 and the instruction level simulator 120 may verify the entire instructions and hardware structure of the model from beginning to end, that is, in an end-to-end manner, through high-level debugging. In contrast, since the register transfer level simulator 130 is too slow to be viewed in an end-to-end manner, the register transfer level simulator 130 may write a test case by dividing the same into modules and may process verification of the written test case. When verification of a single model is sequentially completed through the source code level simulator 110, the instruction level simulator 120, and the register transfer level simulator 130, the hardware may be in a state ready for distribution. As described earlier, a pipeline method allows rapid verification of a plurality of models developed relatively quickly compared to hardware.

Figure 3:
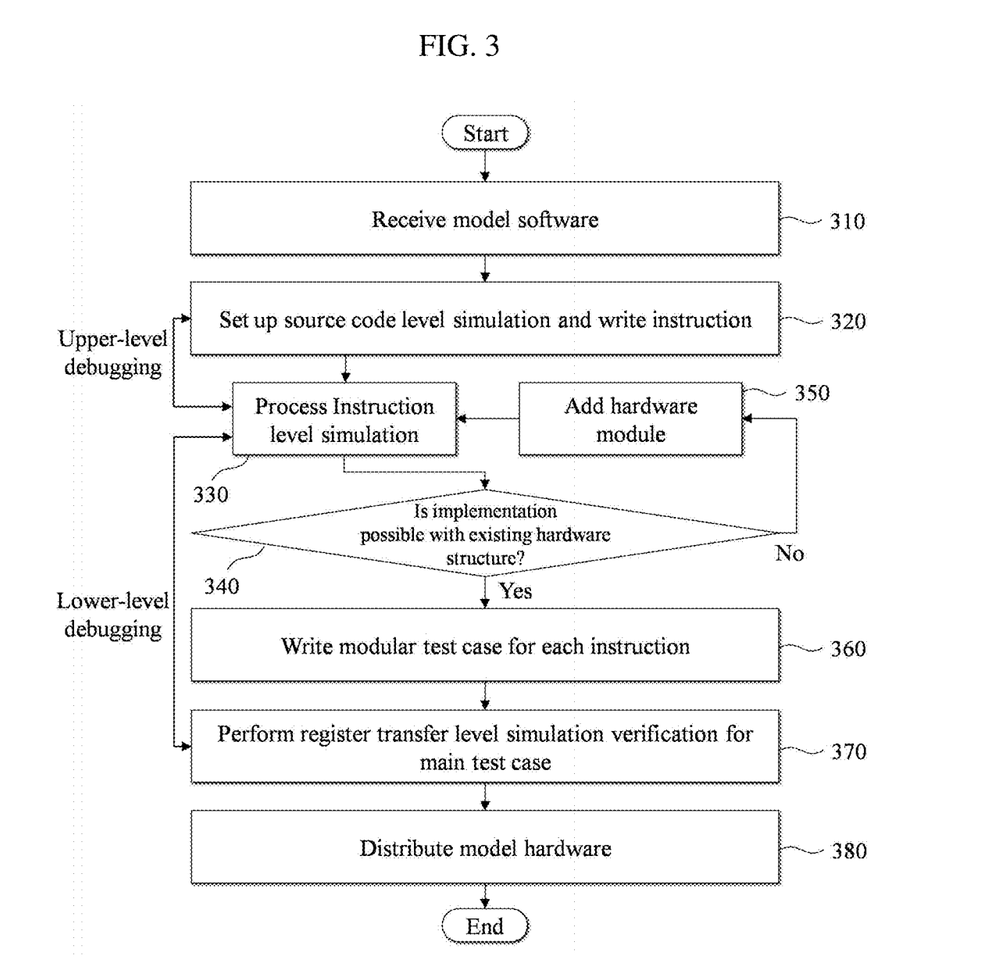
FIG. 3 is a flowchart illustrating an example of a hardware mapping method according to an example embodiment.

FIG. 3 is a flowchart illustrating an example of a hardware mapping method according to an example embodiment. The hardware mapping method according to the example embodiment may be performed by at least one computer device. Here, a processor of the computer device may be implemented to execute a control instruction according to a code of at least one computer program or a code of an operating system included in a memory. Here, the processor may control the computer device to perform operations 310 to 380 included in the method of FIG. 3 in response to a control instruction provided from a code stored in the computer device. Example of a structure of the computer device is further described with reference to FIG. 5.

In operation 310, the computer device may receive model software. For example, the computer device may receive the giant artificial intelligence model 140 of FIG. 1. Depending on example embodiments, the computer device may further receive information on the existing hardware structure in operation 310 or before or after operation 310.

Then, the computer device may sequentially perform source code level simulation, instruction level simulation, and register transfer level simulation for the model software.

In operation 320, the computer device may set up the source code level simulation and may write an instruction. Operation 320 may be a process of performing the source code level simulation using the source code level simulator 110. Here, the source code level simulator 110 may verify whether formula may be easily applied to hardware, whether a model may be changed to be hardware-friendly through quantization, and the like.

In operation 330, the computer device may process the instruction level simulation. The instruction level simulation may be processed through the instruction level simulator 120.

Here, as described above, high-level debugging may be a process in which information identified at a source code level becomes a correct answer and the source code level simulator 110 and the instruction level simulator 120 verify the entire instructions and hardware structure of a model from beginning to end (end-to-end). That is, the computer device may cross-verify the instruction written through the source code level simulation in operation 320 through the instruction level simulation in operation 330.

In operation 340, the computer device may determine whether implementation of the corresponding model software is possible with the existing hardware structure. Here, the existing hardware structure may be acquired through the existing hardware structure 150 described above with FIG. 1. If the implementation of the corresponding model software is determined to not be possible with the existing hardware structure, the computer device may perform operation 350. On the contrary, if the implementation of the corresponding model software is determined to be possible with the existing hardware structure, the computer device may perform operation 360.

In operation 350, the computer device may add a hardware module. For example, the computer device may add the hardware module to the existing hardware structure. Then, the computer device may reperform operations 330 and 340 based on the existing hardware structure with the added hardware module. Such operations 330 to 350 may be repeated until the implementation of the corresponding model software is determined to be possible with the existing hardware structure in operation 340. That is, the computer device may move on to lower-level debugging when the implementation is possible with the existing hardware structure through the source code level simulation and the instruction level simulation, and may add the hardware module and may verify again the instruction when the implementation is impossible with the existing hardware structure.

In operation 360, the computer device may write a modular test case for each instruction. Here, each instruction may represent each instruction cross-verified through the source code level simulation and the instruction level simulation. As described above, since the register transfer level simulator 130 is too slow, a test case may be divided into modules and written and verification of the written test case may be processed. Here, operation 360 may be an example of a process of writing a test case in module units.

In operation 370, the computer device may perform a register transfer level simulation verification for a main test case. This register transfer level simulation may be performed through the register transfer level simulator 130.

Here, lower-level debugging may represent performing verification at an instruction level and a register transfer level for main test cases. That is, in operation 370, the computer device may perform cross-verification of the main test cases by further performing verification using the instruction level simulator 120 in addition to verification using the register transfer level simulator 130.

In operation 380, the computer device may distribute model hardware. Here, the model hardware may include a version of a hardware structure in which the hardware module is added to the existing hardware structure in operation 350 and lower-level debugging is completed. This hardware structure may correspond to the hardware structure 170 described above with FIG. 1. That is, when verification of the computer device is completed, the model instruction 160 and the hardware structure 170 may be provided as output.

Additionally, in the case of upper-level debugging, simulation may be quickly processed using a GPU. For example, the computer device may process cross-verification through the source code level simulation and the instruction level simulation using the GPU. Meanwhile, in the case of lower-level debugging, the GPU is unavailable due to the nature of the register transfer level simulation, but data loading may be quickly processed through multithreading in the process of loading large language model (LLM) data to a simulator. For example, the computer device may process multithread loading of a file of model software for the register transfer level simulation.

Figure 4:
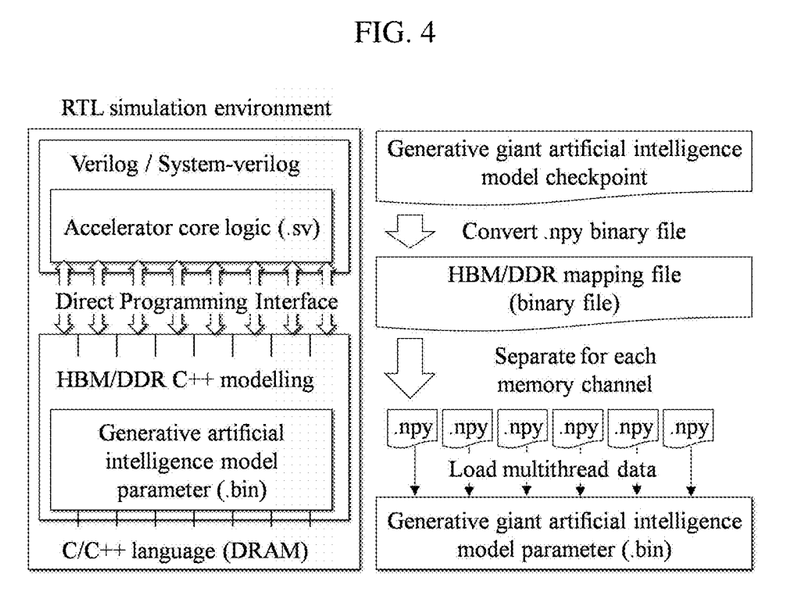
FIG. 4 illustrates an example of a process of processing an artificial intelligence model with large data using a register transfer level simulator according to an example embodiment.

FIG. 4 illustrates an example of a process of processing an artificial intelligence model with large data using a register transfer level simulator according to an example embodiment. In an original case, a large model such as a generative giant artificial intelligence model may not be loaded due to insufficient memory. However, the example embodiments may load a model using dynamic random access memory (DRAM) of a server system using C/C++ language. Also, when loading, it is possible to separate a file for each channel of memory rather than a single large file and to quickly load the same to the memory through multithreading.

As such, according to example embodiments, it is possible to provide a method and system for more efficiently mapping a generative giant artificial intelligence model to hardware.

Figure 5:
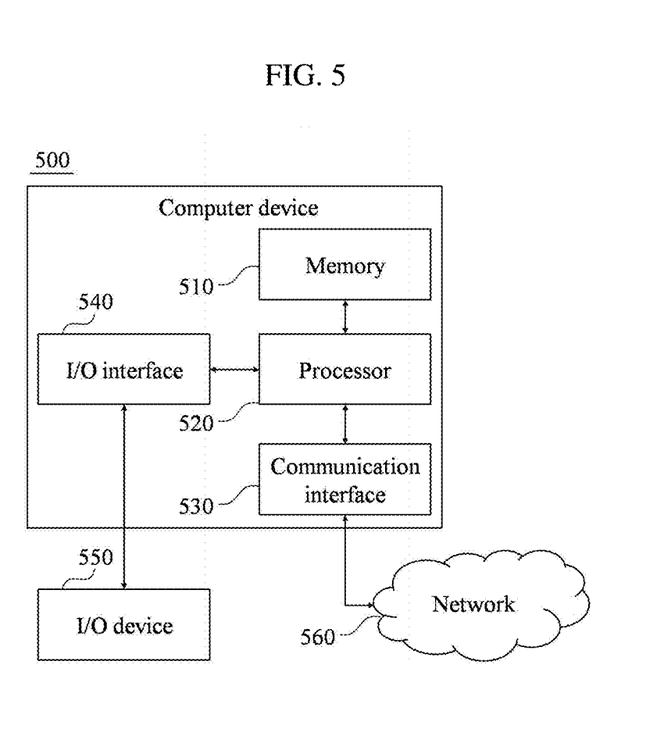
FIG. 5 is a block diagram illustrating an example of a computer device according to an example embodiment.

FIG. 5 is a block diagram illustrating an example of a computer device according to an example embodiment. Referring to FIG. 5, a computer device 500 may include a memory 510, a processor 520, a communication interface 530, and an input/output (I/O) interface 540. The memory 510 may include a permanent mass storage device, such as a random access memory (RAM), a read only memory (ROM), and a disk drive, as a non-transitory computer-readable record medium. The permanent mass storage device, such as ROM and a disk drive, may be included in the computer device 500 as a permanent storage device separate from the memory 510. Also, an OS and at least one program code may be stored in the memory 510. Such software components may be loaded to the memory 510 from another non-transitory computer-readable record medium separate from the memory 510. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 510 through the communication interface 530, instead of the non-transitory computer-readable record medium. For example, the software components may be loaded to the memory 510 of the computer device 500 based on a computer program installed by files received over a network 560.

The processor 520 may be configured to process instructions of a computer program by performing basic arithmetic operations, logic operations, and I/O operations. The computer-readable instructions may be provided by the memory 510 or the communication interface 530 to the processor 520. For example, the processor 520 may be configured to execute received instructions in response to a program code stored in a storage device, such as the memory 510.

The communication interface 530 may provide a function for communication between the computer device 500 and another apparatus, for example, the aforementioned storage devices over the network 560. For example, the processor 520 of the computer device 500 may forward a request or an instruction created based on a program code stored in the storage device such as the memory 510, data, and a file, to other apparatuses over the network 560 under control of the communication interface 530. Inversely, a signal, an instruction, data, a file, etc., from another apparatus may be received at the computer device 500 through the communication interface 530 of the computer device 500. A signal, an instruction, data, etc., received through the communication interface 530 may be forwarded to the processor 520 or the memory 510, and a file, etc., may be stored in a storage medium, for example, the permanent storage device, further includable in the computer device 500.

The I/O interface 540 may be a device used for interfacing with an I/O device 550. For example, an input device may include a device, such as a microphone, a keyboard, a mouse, etc., and an output device may include a device, such as a display, a speaker, etc. As another example, the I/O interface 540 may be a device for interfacing with an apparatus in which an input function and an output function are integrated into a single function, such as a touchscreen. The I/O device 550 may be configured as a single apparatus with the computer device 500.

Also, according to other example embodiments, the computer device 500 may include a greater or smaller number of components than the number of components of FIG. 5. However, there is no need to clearly illustrate most conventional components. For example, the computer device 500 may be configured to include at least a portion of the I/O device 550 or may further include other components, such as a transceiver and a database.

Although the example embodiments are described above with reference to the accompanying drawings, it will be understood by one of ordinary skill in the art that the present invention can be implemented in other specific forms without changing technical spirit or essential features of the invention. Therefore, the example embodiments should be understood in all respects as illustrative and not construed as limiting.

What is claimed is:

1. A hardware mapping method of a computer device comprising at least one processor, the hardware mapping method comprising:
   receiving, by the at least one processor, model software of a generative artificial intelligence model including a large language model (LLM);
   receiving, by the at least one processor, information on an existing hardware structure; and
   sequentially performing, by the at least one processor, source code level simulation, instruction level simulation, and register transfer level simulation for the model software,
   wherein the performing comprises:
   cross-verifying an instruction written with the source code level simulation through the instruction level simulation,
   determining whether implementation of the model software is possible with the existing hardware structure after performing the source code level simulation and performing the cross-verifying before performing the register transfer level simulation;
   adding a hardware module to the existing hardware structure when the implementation is impossible; and
   reperforming the instruction level simulation for verifying the instruction,
   wherein the adding and the reperforming are repeated until the implementation of the model software is determined to be possible with the hardware structure including the added hardware module, and
   wherein the performing further comprises:
   writing a module-level test case for each instruction cross-verified through the source code level simulation and the instruction level simulation; and
   verifying at least one of the written test cases through the register transfer level simulation.

2. The hardware mapping method of claim 1, wherein the verifying comprises performing cross-verification through the register transfer level simulation and the instruction level simulation.

3. The hardware mapping method of claim 1, wherein the performing comprises:
   processing cross-verification through the source code level simulation and the instruction level simulation using a graphics processing unit (GPU); and
   processing multithread loading of a file of the model software for the register transfer level simulation.

4. The hardware mapping method of claim 3, wherein the processing of the multithread loading comprises separating the file of the model software for each channel of a memory and loading the same to the memory through multithreading.

5. A non-transitory computer-readable recording medium storing a program to execute the method of claim 1 on the computer device.

6. The hardware mapping method of claim 1, wherein the receiving comprises a plurality of model software components including the model software, each of the model software components being a generative artificial intelligence model including a large language model (LLM), and
   wherein the sequentially performing comprises sequentially performing the source code level simulation, the instruction level simulation, and the register transfer level simulation for each of the model software components in a pipelined manner such that the model software components are processed in parallel for hardware mapping thereto.

7. A computer device comprising:
   at least one processor configured to execute computer-readable instructions,
   wherein the at least one processor is configured to,
   receive model software of a generative artificial intelligence model including a large language model (LLM), and
   sequentially perform source code level simulation, instruction level simulation, and register transfer level simulation for the model software,
   wherein the at least one processor is configured to
   cross-verify an instruction written with the source code level simulation through the instruction level simulation,
   determine whether implementation of the model software is possible with the existing hardware structure after performing the source code level simulation and performing the cross-verifying before performing the register transfer level simulation,
   add a hardware module to the existing hardware structure when the implementation is impossible, and
   reperform the instruction level simulation for verifying the instruction, wherein the adding and the reperforming are repeated until the implementation of the model software is determined to be possible with the hardware structure including the added hardware module, wherein the at least one processor is configured to write a module-level test case for each instruction cross-verified through the source code level simulation and the instruction level simulation, and verify at least one of the written test cases through the register transfer level simulation.

8. The computer device of claim 7, wherein, to verify at least one of the written test cases, the at least one processor is configured to perform cross-verification through the register transfer level simulation and the instruction level simulation.

9. The computer device of claim 7, wherein the at least one processor is configured to, process cross-verification through the source code level simulation and the instruction level simulation using a graphics processing unit (GPU) included in the at least one processor, and process multithread loading of a file of the model software for the register transfer level simulation using a central processing unit (CPU) included in the at least one processor.

* * * * *